May 1, 1951  O. W. OERMAN  2,551,456
HITCH DEVICE
Filed April 9, 1948

INVENTOR.
OREY W. OERMAN
BY
ATTORNEYS

Patented May 1, 1951

2,551,456

UNITED STATES PATENT OFFICE 2,551,456

HITCH DEVICE

Orey W. Oerman, Moline, Ill., assignor to Deere & Company, Moline, Ill., a corporation of Illinois Application April 9, 1948, Serial No. 19,971

8 Claims. (Cl. 280—33.9)

The present invention relates generally to agricultural machines and more particularly to hitch devices by which agricultural implements are connected to a tractor or other means for propelling them.

The object and general nature of the present invention is the provision of a new and improved hitch device adapted to be connected between an implement, such as a plow or the like, and a farm tractor to be utilized as a source of power for propelling the implement both in its working and its transport positions. More specifically, it is a feature of this invention to provide a cushion hitch device so constructed and arranged as to provide an extra long cushioning unit but without requiring excessive length in the draft transmitting structure. Further, it is a feature of this invention to provide for the transmission of draft forces through a pair of springs arranged serially with a single spring whereby, during normal operation, the latter spring is subjected to a cushioning action, but constructed and arranged so that the extent of compression or imposition of forces on the single spring element is limited by means of abutting parts, abutment of said parts then causing the entire draft pull to be transmitted through the pair of generally parallel springs.

A further feature of this invention is the provision of a cushion hitch device which is so constructed and arranged that the effect of a long cushioning action is secured but without the disadvantages of an excessively long hitch. More particularly, it is a feature of this invention to employ a pair of serially arranged spring means with an intermediate member whereby the force is transmitted from one spring to another and is effected by a part or parts which accommodate a disposition of the two spring means in an overlapping or adjacently mounted relation, whereby the effect of a long cushion spring is secured but without excessive length in the hitch part.

These and other objects and advantages of the present invention will be apparent to those skilled in the art after a consideration of the following detailed description, taken in conjunction with the accompanying drawings, in which one form of the invention has been shown by way of illustration.

Figure 1:
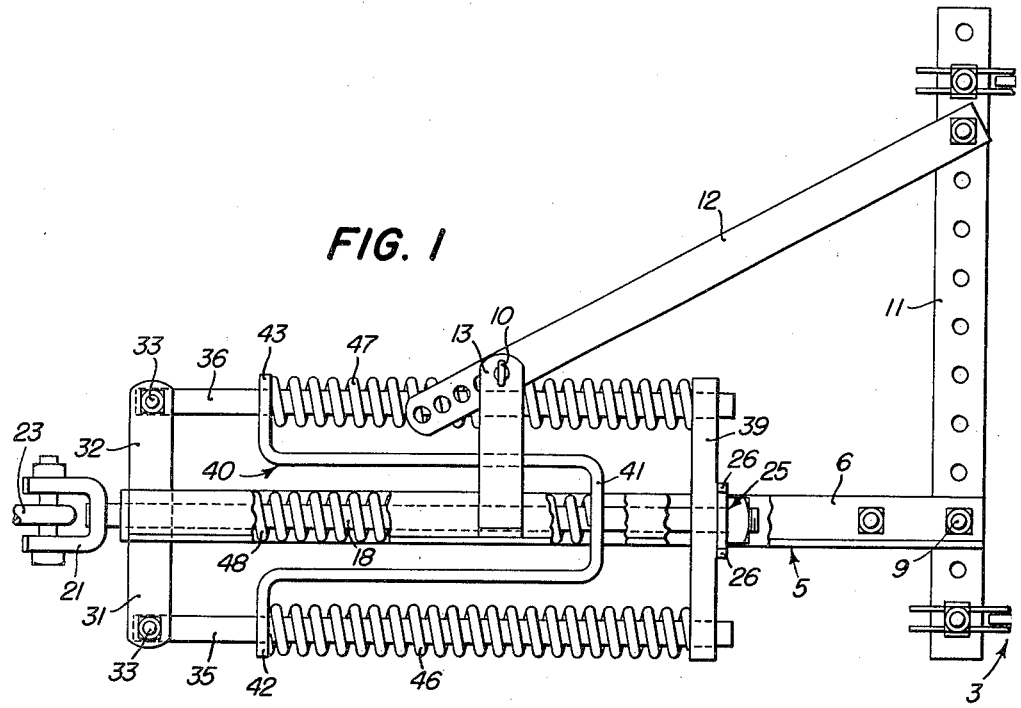
Figure 1 is a plan view of a hitch device in which the principles of the present invention have been incorporated.
Figure 2:
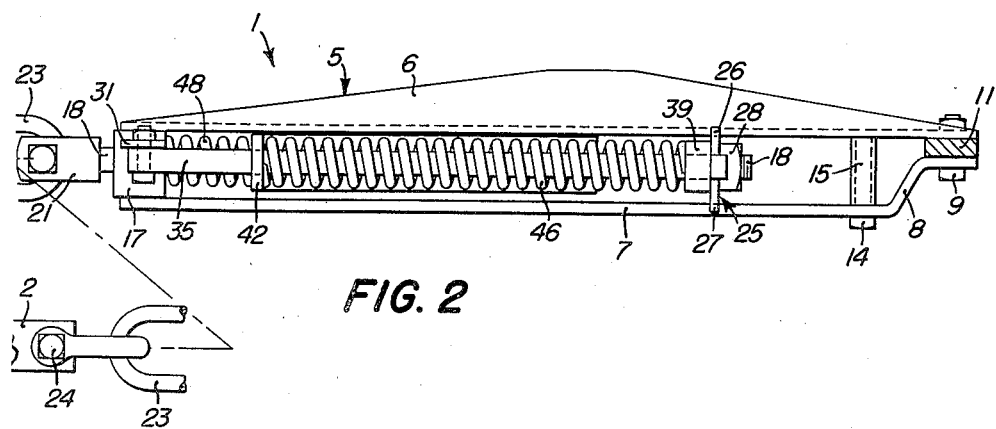
Figure 2 is a side view of the hitch unit shown in Figure 1.

Referring now to the drawings, particularly Figures 1 and 2, the hitch device of the present invention is indicated in its entirety by the reference numeral 1 and is shown as connected between the drawbar 2 of a farm tractor and an implement 3, such as a plow or the like. The hitch unit 1 is of the cushion type, that is, a type in which the transmission of pulling forces from the tractor to the implement is cushioned through the use of springs or the like, whereby both the tractor and the implement are protected from excessive loads due to abrupt changes in the draft forces transmitted, as by the implement striking a stone or root, or to other causes.

The hitch unit 1 includes a main draft member 5 which is made up of an upper angle member 6 and a lower strap member 7. At its rear end the strap member is bent upwardly, as indicated at 8, and apertured to receive a bolt 9 by which the member 5 is connected to a laterally extending hitch bar 11. A brace 12 extends from one end of the hitch bar 11 to a pair of apertured lugs 13 fixed to the upper draft bar 6. The brace 12 is disposed between the ends of the lugs 13 and connected therewith by a pin or bolt 10. The rear ends of the upper and lower draft bars 6 and 7 are held in spaced relation by a bolt 14 and a spacer or bushing 15, as best shown in Figure 2. The front ends of the two draft bars 6 and 7 are secured, as by welding, to a forward apertured block 17 through which an elongated draft rod 18 slidably extends. The forward end of the draft rod 18 is fixed, as by welding, to a yoke 21 which is apertured to receive a bolt 22 by which a swivel 23 is loosely connected therewith. The swivel 23 is connected to the drawbar 2 of the tractor by a draft bolt 24 or the like.

The rear end of the draft rod 18 extends through an opening in a guide plate 25 which has upper and lower pairs of ears 26 and 27 which embrace opposite side edges of the bars 6 and 7. The rear end of the draft rod 18 is connected with the spacer plate 25 by any suitable means, such as a heavy cotter or nut, or other suitable means, as indicated at 28.

Secured to the block 17 and extending laterally outwardly therefrom in opposite directions are two sections 31 and 32 which constitute the forward cross bar, the outer end portions of which are apertured to receive bolts 33 that connect the forward ends of a pair of laterally spaced guide rods 35 and 36 thereto. The guide rods 35 and 36 extend rearwardly, generally in parallelism with respect to the draft rod 18, and the rear ends of the guide rods 35 and 36 extend rearwardly through apertures in a rear cross bar 39. The latter member is apertured centrally to be slidably disposed on the rear portion of the draft rod 18. Also slidably mounted on the draft rod 18, and also on the guide rods 35 and 36, is a generally U-shaped intermediate member, indicated in its entirety by the reference numeral 40. The member 40 includes a rear central section 41, which is apertured to receive the draft rod 18, and its forward ends are turned laterally outwardly, as indicated at 42 and 43, and apertured to receive the guide rods 35 and 36.

A pair of compression springs 46 and 47 is disposed between the member 40 and the rear cross bar 39. The rear ends of the springs 46 and 47 bear against the ends of the cross bar 39 while the forward ends of the springs 46 and 47 bear directly against the end sections 42 and 43 of the intermediate member 40, the springs 46 and 47 lying generally alongside the rearwardly extending portion of the member 40, as best shown in Figure 1. Disposed between the rear central section 41 of the intermediate member 40 and the front cross bar 31, 32 and block 17 is a third spring 48. The rear end of the spring 48 bears against the central section 41 and the forward end of the spring 48 bears against the block 17 and/or the adjacent portions of the extensions 31 and 32.

In operation, the forward pull of the tractor is transmitted to the front end of the draft rod 18, which pull is transmitted thereby directly to the rear cross bar 39. The draft pull is then transmitted through the parallel springs 46 and 47 directly to the front ends 42 and 43 of the U-shaped intermediate member 40, and from the rear end portion 41 of the latter the force is transmitted through the spring 48 to the forward cross bar section 31, 32 of the draft member 5, and thence to the implement 3. By virtue of the overlapping relation of the springs 46, 47 and 48 the hitch structure is compact longitudinally but nevertheless provides for a relatively long cushioning action, in the order of eight to ten inches in one form of the invention. Normally, the two parallel springs 46 and 47 are compressed only about half as much as the forward single spring 48, during which time the member 40 approaches the cross bar 31, 32. When, however, the draft pull begins to be excessive, the forward end sections 42 and 43 of the member 40 engage the forward cross bar 31, 32, with the result that the forward spring 48 is no longer compressed further but all draft is now transmitted through the two parallel springs 46 and 47, whereby the forward spring 48 is protected against excessive deflection, yet during normal operation adequate cushioning is assured.

While I have shown and described above the preferred structure in which the principles of the present invention may be incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A cushion hitch device comprising a pair of relatively movable parts, one adapted to receive a pulling force and the other adapted to transmit said force to a means to be pulled, means for resisting relative movement therebetween in one direction including a pair of compression springs engageable with one of said parts and a third compression spring engageable with the other part and adapted to receive the pull transmitted by said pair of compression springs to said third spring, and means for limiting the amount of compression imposed on said third spring, whereby additional pull may be transmitted from one of said parts to the other through said limiting means by said pair of compression springs.

2. A cushion hitch device comprising a pair of relatively movable parts, one adapted to receive pull from a tractor or the like and the other adapted to transmit the pull to an implement or the like, means for resisting relative movement between said parts in one direction and including a pair of compression springs engageable with one of said parts and a third compression spring engageable with the other part and adapted to receive the draft pull transmitted by said pair of compression springs to said third spring, and means for limiting the amount of compression imposed on said third spring, whereby additional draft pull is transmitted from one of said parts to the other through said limiting means by said pair of springs only.

3. A cushion hitch device comprising a pair of relatively movable slidably interconnected parts, one adapted to receive the tractive pull and the other adapted to transmit the pull to an implement or the like, an intermediate member disposed between said parts and shiftable relative to both, a pair of springs disposed generally in parallelism between said intermediate member and one of said parts, and a single spring acting between said intermediate member and the other of said parts.

4. A cushion hitch device comprising a pair of relatively movable parts, an intermediate part disposed between said two relatively movable parts, a pair of generally parallel springs disposed between said intermediate part and one of said relatively movable parts, a third spring disposed between said first mentioned relativley movable parts and said intermediate part, and means on the latter engageable with the other of said relatively movable part for terminating relative motion therebetween whereby all of the pull is transmitted by said pair of springs.

5. A cushion hitch device comprising a pair of relatively movable parts, one including a pair of laterally spaced guide rods and the other including a rear section slidable on said guide rods and a forward section extending forwardly beyond said first part, a pair of compression springs disposed about said guide rods and bearing at their rear ends against said rear section on said second part, a member slidable relative to said guide rods and also relative to said second part, the forward ends of said springs bearing against said member, and a single spring bearing at its rear end against said member and at its forward end against the forward portion of said first mentioned part.

6. A cushion hitch device comprising a pair of relatively movable parts, one including a pair of laterally spaced guide rods and the other part including a rear abutment section slidable on the rear portions of said guide rods and a forward section shiftable relative to said first part, a pair of compression springs disposed on said guide rods and bearing at their rear ends against said abutment member, an intermediate member slidable on said guide rods and receiving the forward ends of said springs, a single spring disposed between said intermediate member and the forward portion of said one part, and means serving as stop means acting between said intermediate member and said one part for limiting the amount the third spring may be compressed.

7. A cushion hitch device for agricultural implements and the like, comprising a generally longitudinally extending draft member, a transverse bar fixed to the forward end of said member, a draft rod slidable relative to said transverse bar and said member and extending rearwardly of said bar, a transverse bar fixed to the rear end of said draft rod, a pair of guide rods fixed at their forward ends to said first bar and shiftable therewith relative to said second bar, an intermediate U-shaped member disposed for sliding movement on said draft and guide rods with its central section disposed rearwardly and its forward ends disposed adjacent said first bar, a pair of springs confined between the forward ends of said U-shaped member and said second bar, and a third spring disposed generally between said first mentioned springs and bearing at its rear end against the central part of said U-shaped member and at its forward end against the forward part of said draft member.

8. A cushion hitch device for agricultural implements and the like, comprising a generally longitudinally extending draft member, a transverse bar fixed to the forward end of said member, a draft rod slidable relative to said transverse bar and said member and extending rearwardly of said bar, a transverse bar fixed to the rear end of said draft rod, a pair of guide rods fixed at their forward ends to said first bar and shiftable therewith relative to said second bar, an intermediate U-shaped member having an apertured central portion adapted to receive said draft rod and apertured laterally outturned ends receiving, respectively, said guide rods, said U-shaped member being thus mounted on said draft guide rods for sliding movement relative thereto, the central section of said U-shaped member being disposed rearwardly and its outturned ends disposed adjacent said first mentioned bar, a pair of springs confined between the forward ends of said U-shaped member and said second bar, and a third spring disposed generally between said first mentioned springs and bearing at its rear end against the central part of said U-shaped member and at its forward end against the forward part of said draft member, the forward outturned ends of said U-shaped member being adapted to engage said first mentioned transverse bar for limiting the forward movement of said U-shaped member relative thereto.

OREY W. OERMAN.

REFERENCES CITED

The following references are of record in the file of this patent:

UNITED STATES PATENTS

| Number | Name | Date |
|---|---|---|
| 775,216 | Graham | Nov. 15, 1904 |
| 1,731,149 | Rafflenbeul | Oct. 8, 1929 |
| 1,816,121 | McLamarrah | July 28, 1931 |
| 1,860,391 | Meyer | May 31, 1932 |